April 29, 1947.   A. G. KANDOIAN   2,419,562
ANTENNA ARRAYS
Filed March 10, 1942   3 Sheets-Sheet 1

INVENTOR.
ARMIG G. KANDOIAN
BY Paul R. Adams
ATTORNEY

INVENTOR.
ARMIG G. KANDOIAN
BY Paul R. Adams
ATTORNEY

Patented Apr. 29, 1947

2,419,562

UNITED STATES PATENT OFFICE 2,419,562

ANTENNA ARRAY

Armig G. Kandoian, New York, N. Y., assignor to Federal Telephone and Radio Corporation, a corporation of Delaware Application March 10, 1942, Serial No. 434,069

17 Claims. (Cl. 250—11)

This invention relates to improvements in antenna directive systems and more particularly to such systems as are employed in defining radio courses for aircraft or other mobile units. The invention is considered applicable both for transmitting and receiving purposes and may be particularly adaptable to directional discrimination purposes, for example, in connection with known forms of radio locating devices. Such locating devices have been disclosed in the copending applications of H. Busignies, Serial No. 382,391, and 417,151, filed March 8, 1941, and October 30, 1941, respectively, and E. Labin, Serial No. 383,108, filed March 13, 1941.

It is a primary object of the invetion to provide an improved directional antenna array having relatively high direction-discriminating properties and adaptable either as transmitting or receiving array.

Another object is to provide improved means for defining a course for aircraft with relatively high efficiency.

A further object is to provide an improved directive antenna device having relatively highly directional radiating characteristics substantially along a single directivity axis with negligibly small radiation for substantially all angles remote from said axis and preferably with no nulls or minor lobes remote from the axis.

It is also an object to provide an improved two-course beacon antenna array producing a radiation pattern of the nature disclosed in the copending application Serial No. 303,206, filed November 7, 1939, of A. Alford, and having greater directivity characteristics.

It is a further object to provide improved means for substantially eliminating minor lobes of radiation as produced by highly directive antenna arrangements.

A still further object is to provide an improved directive antenna arrangement having means for adjustably changing an angle of the directivity thereof.

Still another object is to provide improved radio directive means whereby harmful effects due to nearby reflecting bodies may be substantially eliminated.

Other objects and various further features of novelty and invention will hereinafter be pointed out or will occur to those skilled in the art from a reading of the following specification in connection with the accompanying drawings. In said drawings—

It is known that energy may be radiated with relatively high efficiency by antenna arrays of the so-called binomial type. In this type of arrangement, a number of radiating elements are regularly spaced with respect to each other and in substantially aligned relation and each successive element is fed with the energy to be radiated, the magnitude of energy fed to one such element being proportional to a coefficient of a binomial expansion of a power one less than the number of elements. To illustrate, if a five-element array were employed, the outside elements would be fed with energy proportional to a magnitude 1; the next to the outside elements would be fed with energy proportional to a magnitude 4; and the middle element would be fed with energy proportional to a magnitude 6; the magnitudes 1, 4, 6, 4, 1 being coefficients of the successive terms of a binomial expansion of the fourth power (i. e., there being five antenna elements, the fourth power of the binomial expansion is used).

Figure 5:
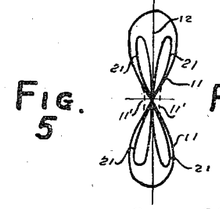
Figs. 5, 6, 9, 11a, 11b, 11c and 11d illustrate radiation characteristics as obtained by arrays shown in Figs. 1, 2, 4a, 4b, 8, 9, and 12.

If the spacings S between the individual elements of such a "binomial" array be on the order of or less than one-half a wavelength at the operating frequency, it is possible to radiate in accordance with a characteristic of the nature shown by pattern 11 in Fig. 5, and it will be noted in this case that no minor lobes are present for substantially all angles off the axis 12 of directivity of pattern 11.

The above-mentioned copending application of A. Alford broadly outlines a method of and structure for producing a so-called "clover leaf" pattern of radiation. Such patterns are characterized usually by four major lobes of radiation, the major lobes to one side of a normal to the antenna array producing them being of opposite polarity to that of the major lobes on the other side thereof. However, if the elements of the arrays proposed for producing such "clover leafs" are moderately spaced the lobes are rather broad giving only moderate sharpness to the beacon using this pattern, while if wider spacings are used, large minor lobes and secondary nulls are produced.

Figures 1, 2:
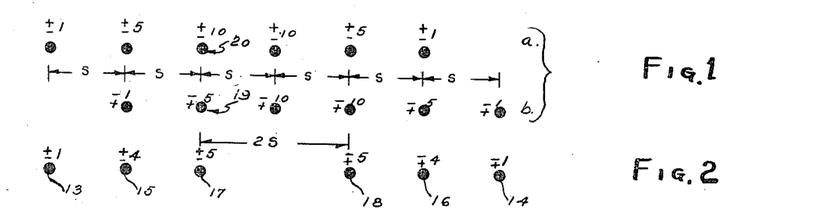
Figs. 1, 2, 4a, 4b, 8, 10 and 12 schematically illustrate preferred layouts and energy distribution proportions for directive arrays in accordance with the invention.

In accordance with the present invention, the "binomial" array is adapted to produce a cloverleaf pattern having highly directive properties and substantially no radiation for substantially all angles off the directivity axis. This effect is produced by effectively combining two "binomial" arrays having preferably the same number of elements, one being fed with energy substantially out of phase with the other and the two arrays being disposed in staggered relation with each other, that is, spaced from each other preferably an integer multiple of the distance S between elements. Figs. 1 and 2 illustrate how such a combination of binomial arrays may be effected. The upper row of elements generally designated $a$ in Fig. 1 shows a six-element binomial array in which all elements are separated by the same spacing S, and successive elements are fed with energy proportional to the successive magnitudes 1, 5, 10, 10, 5, 1, corresponding to coefficients of a fifth-power binomial expansion. The lower or $b$ row in Fig. 1 represents a similar structure, but, as will be noted from the numerical designations above each element, energy supplied to the array of row $b$ is out of phase with that supplied to the array of row $a$.

Figure 3A:
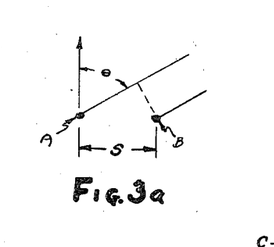
Figs. 3a and 3b illustrate graphically certain relationships characterizing the invention.
Figure 3B:
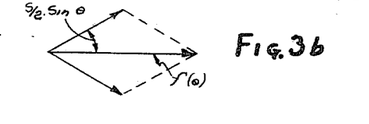

A better understanding of resultant radiation characteristics as obtained with combinations of arrays in the above manner will be had from a brief analytical treatment. Considering the two radiators A and B of Fig. 3a as spaced apart a distance S, it is clear that radiation from A will, in a direction making an angle $\theta$ with the normal to the axis A—B, be retarded in phase with respect to radiation from B an amount equal to S sin $\theta$. Now, at some distance out and relatively great with respect to the spacing S, radiation from both elements A and B will appear to originate at the same point; and, due to the above-noted relative phase displacement, the total detectable radiation $f(\theta)$ will be a vectorial summation of that due to A and that due to B as shown in Fig. 3b. Thus—

$$f(\theta) = K \cos\left(\frac{S}{2} \sin \theta\right), \text{ where K is a constant} \quad (1)$$

Now, since a binomial array is merely the result of raising an elemental array, such as A, B, to a desired power of expansion, resultant radiation from such an array may be obtained simply by raising Expression 1 to the desired power. Thus, for a five-element binomial array, representing a fourth-power binomial expansion, resultant radiation as a function of $\theta$ will be—

$$f(\theta)_5 = K_5 \cos^4\left(\frac{S}{2} \sin \theta\right) \quad (2)$$

or, more generally—

$$f(\theta)_n = K_n \cos^{n-1}\left(\frac{S}{2} \sin \theta\right) \quad (3)$$

where $n$ equals the number of elements in a binomial array. The effect of such a power expansion will be to yield an array having relatively directional radiation characteristics, provided S is greater than 0.2 wavelength. If the value of S is between 0.25 and 0.75 wavelength, as is generally desirable, this radiation will be observed as being characterized essentially by two lobes of the same polarity and extending in opposed senses. This type pattern is hereinafter referred to as a "dumb-bell" and, for a spacing between conductors less than one half a wavelength, will be substantially of the form shown in Fig. 5 by the two-lobe pattern 11 including the necked-down portions 11' (shown dotted), rather than reaching zero where $\theta = \pm 90°$ (the latter being the case for element spacings equal to one-half a wavelength).

Figure 3C:
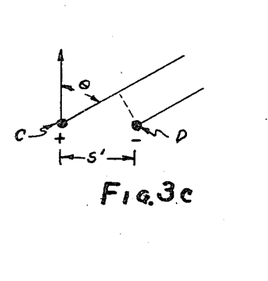

Now, in accordance with the invention two such dumb-bell arrays of opposed polarity are combined to yield a more sharply directive clover-leaf-producing array. The combined effects of two such arrays may be obtained by considering one array as a unit C fed with energy of one polarity sense and the other array as a unit D fed with energy of opposite polarity sense, as shown in Fig. 3c. Thus, energy from array C in direction $\theta$ will be retarded $$\frac{S'}{2} \sin \theta + 90°$$

with respect to that from array D in the same direction; and at a distance large with respect to the spacing S' between arrays C and D, resultant radiation $f'(\theta)$ will be proportional to $$\sin\left(\frac{S'}{2} \sin \theta\right)$$

Since radiation from each array is of the magnitude indicated in Equation 3, overall radiation from the combined array will be—

$$f'(\theta)_n = K \cos^{n-1}\left(\frac{S}{2} \sin \theta\right) \cdot \sin\left(\frac{S'}{2} \sin \theta\right) \quad (4)$$

and if the spacing S' between arrays be narrowed down to the spacing S between elements, we may reach the simplification—

$$f'(\theta)_n = K \cos^{n-1}\left(\frac{S}{2} \sin \theta\right) \cdot \sin\left(\frac{S}{2} \sin \theta\right) \quad (5)$$

as will be clear.

In accordance with the invention, a single array combining the properties of the two arrays of rows $a$ and $b$ of Fig. 1 may be designed as shown in Fig. 2 by providing an antenna element for each spacing shown in either one or both of these rows and feeding each of these elements with current proportional to a vectorial summation of the respective magnitudes of currents fed corresponding elements in the arrays of row $a$ and row $b$. Thus the extreme or outer elements 13, 14 (each representing an element from only one of the arrays of Fig. 1) are fed with current proportional in each instance to the magnitude 1; the elements 15, 16 next to the end are fed with current proportional to the magnitude 4 (the resultant of a vectorial combination of magnitudes 5 and 1 in opposed senses) and the innermost elements 17, 18 are fed with current proportional to the magnitude 5 (the resultant of a vectorial combination of magnitudes 10 and 5 in opposed senses). It will be noted that no centrally located element corresponding to elements 19 and 20 of the arrays of Figs. 1a and 1b need be provided in the array of Fig. 2 inasmuch as current characterizing each of elements 19 and 20 is always of the same magnitude, one being out of phase with the other, whereby a zero resultant is obtained from a vectorial addition.

It will further be noted in connection with the array of Fig. 2 that current fed to the elements 13, 15 and 17 on one side of the array is always out of phase with that fed to the elements 18, 16 and 14 on the other side. The effect is thus to set up a "clover leaf" pattern, which, for S equals one half a wavelength, is of the nature shown in Fig. 5 and designated by reference numeral 21. In the "clover leaf" 21, as has been shown to be the case in the above-mentioned application of A. Alford, radiation is substantially zero along the directivity axis, with a major lobe of one polarity on one side of the axis and another major lobe of opposite polarity on the other side. By adapting the binomial array to the production of a "clover leaf" pattern, that is, by combining two binomial arrays of opposed polarity, as in the case of the array of Fig. 2, it will be observed that the result is very materially to sharpen the directivity of these lobes and to confine them relatively closely to the axis of directivity.

Now, in order to define a radio course such as may be followed by aircraft, it is considered preferable in accordance with the teachings of the above mentioned Alford application, to apply to the array producing the clover leaf the vector difference of a first signal and a second signal (which may be based upon carriers of closely similar frequencies or preferably of the same frequency), while at the same time symmetrically radiating over both sides of the course energy corresponding to the vector summation of said first and second signals. The two signals may, for example, comprise identical carriers modulated respectively with 90 cycle and 150 cycle sinusoids, or identical carriers keyed with different signals, e. g., A and N codes. Preferably the phases of the carriers in the two signals are identical, so that the vector difference applied to the clover leaf array has little or no unmodulated carrier component, while the vector sum, to be symmetrically radiated as hereafter explained, has a considerable unmodulated carrier component.

If the modulation is effected by keying, this preferred phase relation would mean that the "key down" intervals of the first signal represent carrier of the same phase as that represented by the "key down" intervals of the second signal. Thus the clover leaf array which is fed with the vector difference of the two signals, would receive no energy during overlap periods corresponding to simultaneous "key down" intervals of both signals and likewise would receive no energy during gaps corresponding to simultaneous "key up" intervals of both signals. Preferably, however, the keying is complementary, in which case it is practically immaterial whether the two signals are represented by carriers of like phase (giving phase reversals on the clover leaf array) or by carriers of opposite phase (giving constant phase applied to the clover leaf array and phase reversals in the energy to be symmetrically radiated). The symmetric radiation of energy corresponding to the vector sum of the two given signals which has been mentioned above, may be effected by antenna means separate from those used for producing the "clover leaf" radiation, or in accordance with a feature of my invention this symmetric radiation may be effected by antenna means at least partially common to the antennae producing the clover leaf array.

Figures 4A, 4B, 12:
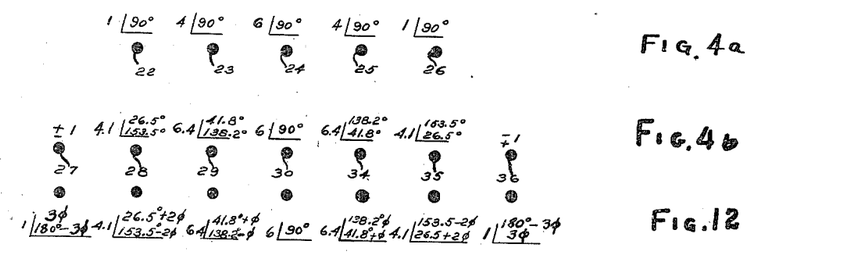

In order to confine substantially all radiation about the axis of directivity, it is considered preferable that this additional radiation be supplied from a binomial array, such as for example, that shown in Fig. 4a. The array of Fig. 4a will be seen to comprise five elements 22, 23, 24, 25, 26 all of which are spaced an amount equal to S, the spacing between units of the array of Fig. 2. Since the array of Fig. 4a is a five-element array, current fed the respective units thereof is preferably proportional to the successive magnitudes 1, 4, 6, 4, 1, corresponding to coefficients of a fourth-power binomial expansion. When the elements 22, 23, 24, 25, 26 are thus fed, a generally directive radiation pattern such as that designated as 11 in Fig. 5, may be produced. Preferably pattern 11 is produced simultaneously with the clover leaf 21, the energy supplied the respective elements 22, 23, 24, 25, 26 being 90° out of phase with that supplied the elements of the array of Fig. 2.

Now, in accordance with my invention, the effects of the arrays of Figs. 2 and 4a may be combined in a single array as shown in Fig. 4b merely by feeding each antenna element thereof with currents proportional in magnitude and phase to a vectorial combination of that fed the respective units of Figs. 2 and 4a. Thus, outer element 27 of Fig. 4b may be fed with current proportional to the magnitude 1 (since in the assumed case there is no need to combine any elements of the array of Fig. 4a with that of Fig. 2). In the case of complementarily keyed signals, energy is fed first at 0° and then at 180°. The next element 28 is fed with current proportional to a magnitude 4.1, first at 26.5° and then alternately at 153.5° (corresponding to a vectorial summation of the magnitudes ±4 and 1/90°; the next element 29 is fed with current proportional to the magnitude 6.4, first at 41.8° and then alternately at 138.2° (corresponding to a vectorial summation of ±5 and the magnitude 4/90°), and so on for the remainder of the elements of Fig. 4b.

It will be noted that since the array of Fig. 4a required a central element 24 whereas there was none in the array of Fig. 2, the combined array of Fig. 4b includes an element 30 corresponding thereto and fed with current proportional to the constant magnitude 6/90°. It will be observed from the symmetry of current alternately fed to the elements of the array of Fig. 4b that a first radiation pattern must be produced, and then for the alternate supply of currents another radiation pattern of inverse shape must necessarily be set up. If S be approximately half a wavelength these alternate resultant patterns may be of the nature shown in Fig. 6 wherein the resultant pattern 31, hereinafter referred to as "bean-shaped," represents radiation for one set of feeding conditions and the inverse pattern 32 represents radiation corresponding to the other set of feeding conditions.

Figures 6, 9:
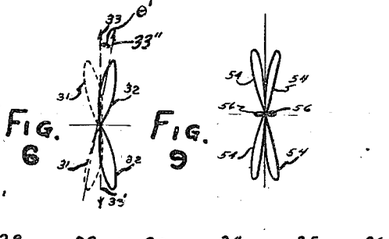

It will be noted that both patterns 31 and 32 overlap and intersect at a relatively narrow angle, thus setting up an equisignal course of relatively high sensitivity. It will further be noted that if the spacing S be chosen to be of the order of magnitude of one half the wavelength of the energy being radiated, substantially no radiation takes place for substantially all angles off the desired course indicated by arrows 33, 33'.

Figure 7:
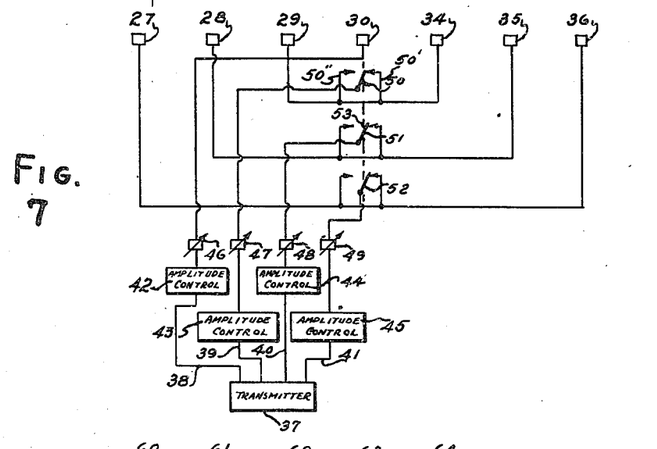
Figs. 7 and 7a are schematic block diagrams of possible circuits for feeding an antenna array of the general nature shown in Fig. 4b to produce a radiation characteristic of the nature shown in Fig. 6.

A suitable circuit for supplying the array of Fig. 4b with appropriate energy for setting up the alternate patterns 31, 32 of Fig. 6 is shown in Fig. 7, wherein the elements 27, 28, 29, 30, 34, 35, 36 of the combined array of Fig. 4b will be recognized. In the form shown, all of these elements are fed from a common transmitter 37 by means of four channels, 38, 39, 40, 41, since only four different magnitudes of energy need be furnished for the particular array shown. Accordingly, appropriate amplitude control means 42, 43, 44, and 45 is provided in each of these channels which are then directly connected through phase adjustment means 46, 47, 48, 49 to their appropriate antenna elements.

In the form shown, keying means 50, 51, 52 are provided to bring about the above-mentioned alternate feeding conditions. All of these keying means are concurrently operated, as indicated schematically by the dot-dash line 53 through their pivotal points. By appropriately designing the lengths of the transmission lines connecting the respective keying means to the antenna elements, it is clear that in one keyed position as shown, current may be fed to all of the antenna units at substantially the magnitudes and phasal relations indicated in the upper set of figures of Fig. 4b for one set of feeding conditions; and in the alternate position of keying means 50, 51 and 52, the alternate set of feeding conditions illustrated in Fig. 4b may be employed, as will be clear. To this end, it is considered preferable that the contact arms associated with each of the keying means, as for example, the arms 50' and 50'' associated with keying means 50, be of the same electrical length and more preferably that they be of a length such that when such an arm is open, that is in an alternate position in which that arm is not used, it will offer relatively high impedance, and hence negligible disturbance at its point of connection to the transmission line supplying energy to the antenna elements.

It is known that utmost directivity of antenna arrays is not obtained with the above-mentioned preferred antenna array element spacings, inasmuch as they are of the order of one-half a wavelength and thus relatively close to each other. The trouble with larger spacings is that minor lobes are developed in off-course directions, thus making for the possibility of false courses between these minor lobes. Fig. 9 graphically illustrates this phenomenon for a typical clover leaf array having element spacings greater than one-half the wavelength. It will be observed that although the major lobes 54 of the clover leaf have been sharpened and narrowed down toward the directivity axis by such increased spacing, two minor lobes 56 are present. It has been observed in experiments that when the spacing between antenna elements is increased to as much as two-thirds of a wave-length, the maximum magnitude of off-course radiation, that is, minor lobe radiation, is about 5% of the maximum radiation of the major lobes 54.

Figure 10:
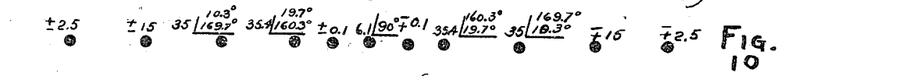

In accordance with the invention, I provide means for eliminating deleterious effects of this minor radiation and still provide a highly directive course. A suitable array for effecting this result has been designed and is shown in Fig. 10. The manner of deriving such an array is illustrated graphically in the four showings of Fig. 8, in which row a represents a layout of the elements of an eight-element array suitable for producing a clover leaf having relatively highly directive major lobe radiation. This array, it will be clear, represents a combination of two binomial arrays of opposite sign, each binomial array being a seventh power expansion and one array being displaced with respect to the other an amount equal to the distance between elements of one of said arrays. As above noted, minor lobe radiation is not objectionable with a two-thirds wavelength spacing. Accordingly, the spacing between elements of the array of Fig. 8a was selected as 240°. It will be noted that, since a cancellation was obtained for the center element upon combination of the two binomials necessary to produce this array, there is no center element for the combined array of Fig. 8a, and the spacing between the two most centrally located elements is twice the spacing for the other elements, namely, 480°.

Figures 11A, 11B, 11C, 11D:
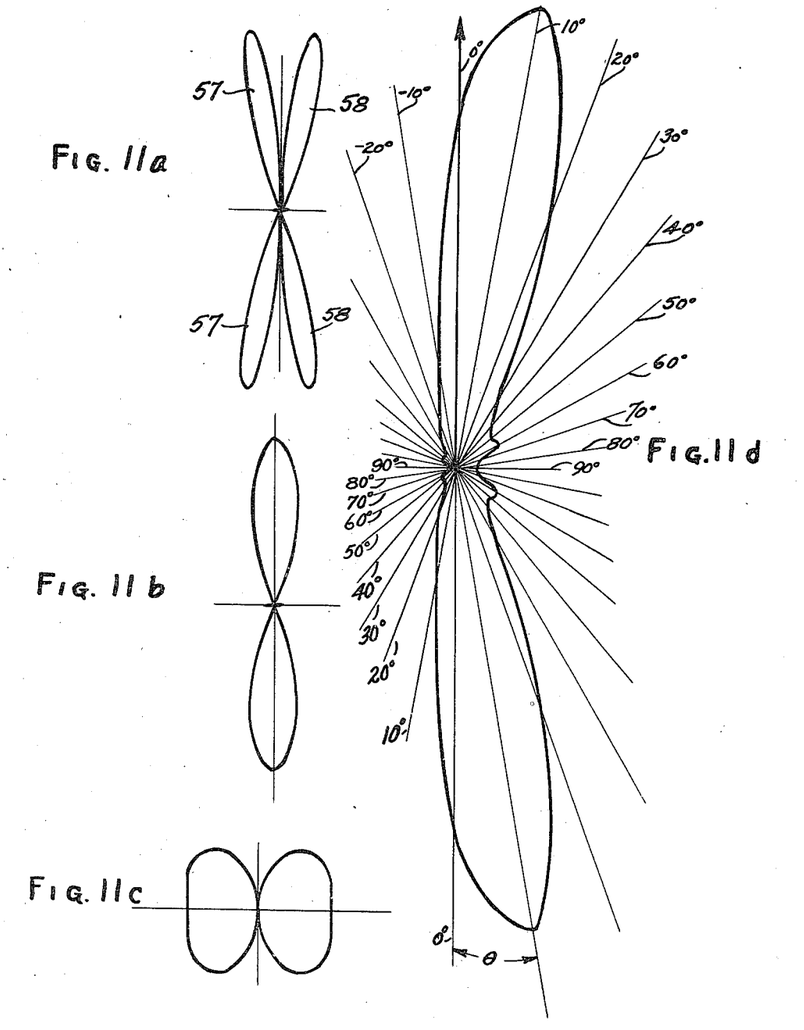

It will be recalled from Expression 5 above, that the equation of radiation for such an array is given by the relation $$f(\theta) = K \cos^7\left(\frac{S}{2}\sin\theta\right) \cdot \sin\left(\frac{S}{2}\sin\theta\right)$$

and since $S=240°$, this expression simplifies to $f(\theta) = K \cos^7(120 \sin \theta) \cdot \sin(120 \sin \theta)$. Radiation is thus of the form shown in Fig. 11a wherein the major lobes 57 are of one polarity sense while the major lobes 58 are of opposite polarity sense. The presence of a minor lobe normal to the course, will be observed between major lobes.

Figure 8:
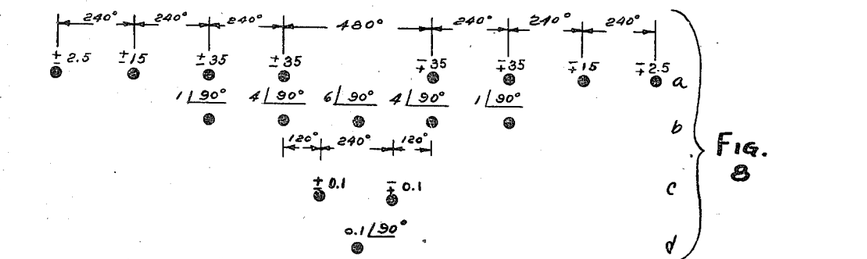

A suitable binomial array for producing a dumb-bell to go with the clover leaf of Fig. 11a is shown in row b of Fig. 8 in which it will be noted that the spacings between elements are again 240° so as to make for a simplification of the combined array structure. In the form shown, this array comprises five elements and is thus similar to that shown in Fig. 4a. Radiation of this array is given by the expression $f(\theta) = K \cos^4(120 \sin \theta)$ and has been plotted as Fig. 11b. It will be noted that inasmuch as the spacing between elements is again more than half a wavelength, minor lobes may be observed between the major lobes of radiation, the minor lobes being directly normal to the course.

It is clear that if the dumb-bell of Fig. 11b were to be combined merely with the clover leaf of Fig. 11a, resultant radiation would include substantial minor lobes and, accordingly, would set up false courses for aircraft located well off course. I, therefore, consider it preferable to provide additional array means effectively to extinguish the above-noted minor lobe radiation and thus to avoid any possibility of obtaining false courses. It will be clear that in order to eliminate or avoid the possibility of false courses, any one resultant radiated signal or "bean" should have radiation to a particular side of the course greater for any given angle than that to the other side for the same given angle of deviation from the course. Accordingly, I would recommend that further and relatively simple means be provided to effect this result. In the form shown, this means includes an additional array (shown in set c of Fig. 8) for producing a clover leaf characterized by radiation substantially off course rather than on course, but polarized, as in the case of the array of row a of Fig. 8. The array of row c of Fig. 8 is thus seen to comprise only two elements representing a combination of two first-power binomial expansions in opposed polarity senses and spaced 240° with respect to each other ($S=120°$ because there is a cancellation and therefore no need for a central element). The radiation for such an array is given by the expression $f(\theta) = K \cos(60 \sin \theta) \cdot \sin(60 \sin \theta)$ and this is shown in the curve of Fig. 11c. As will hereinafter appear the clover leaf thus produced has the effect of substantially eliminating the minor lobe of the clover leaf produced by the array of row a of Fig. 8. As for the minor lobes of the radiation pattern produced by the array of row b of Fig. 8, it is clear that these may be eliminated by pure circular radiation as produced by a single antenna element, such as that shown in row d of Fig. 8.

I have found that when the currents fed the end (that is the outer) elements of each of the successive arrays of Fig. 8 are adjusted in proportion to 2.5:1:0.1:0.1, respectively, all other current magnitudes for the remaining individual elements of the arrays of Fig. 8 being correspondingly proportioned, minor lobes may be very effectively eliminated without noticeably affecting the directional sensitivity of the radiation on course. For the above noted current proportion, radiation for all of the elements spaced and fed as shown, will be substantially of the nature shown in Fig. 11d. A single array producing such a radiation pattern may be readily calculated from a vectorial addition of the current feeding the respective separate arrays, and the magnitudes and phasal relations of currents for such an array are shown in Fig. 10.

In accordance with another feature of the invention, I provide means for adjustably varying the directivity axis of any one of the arrays of the above-described nature. Such a varation may be effected by an adjustment in the phase of energy supplied to the respective elements of one of the arrays. This adjustment may be obtained by successively advancing the phase of energy fed to elements to one side of the center of a particular array and successively delaying the phase of energy supplied to elements to the other side of the center a proportional amount. It is considered preferable that the amount of phase adjustment be an additional equal increment $\phi$ for each additional element spaced from the center of the array; that is, the increment $\phi$ should be proportioned to the physical distance of any particular element from the center of the array. To illustrate, Fig. 12 shows how an antenna of the nature shown in Fig. 4b should be adjusted to produce a certain change in the directivity of the course defined thereby. It will be noted that the phase of energy supplied to the elements immediately adjacent the center element is changed by an amount $\pm\phi$ depending upon which alternate condition of feeding is considered, the elements next further out are fed with energy displaced an additional amount equal to $\pm 2\phi$, and the extreme elements are fed with energy displaced with an amount $\pm 3\phi$, under these conditions. Resultant radiation will then be given by the expression—

$$F'(\theta)_n = K_n \cos^{n-1}\left(\frac{S}{2}\sin\theta + \frac{\phi}{2}\right)\sin\left(\frac{S}{2}\sin\theta + \frac{\phi}{2}\right) \quad (6)$$

By simple trigonometry, and considering the delay $\phi$ (or multiple thereof) supplied to the respective antenna elements, it can be shown that the new direction 33'' (see Fig. 6) of effective directivity of the course beacon veers an angle $\theta'$ from the original assumed direction 33 (normal to the line of disposition of the elements of the antenna array) and that $\theta'$ equals $$\sin^{-1}\frac{\theta}{S} \text{ approximately}$$

Thus far, I have described my invention as being particularly adaptable to the defining of radio courses for mobile units such as aircraft. It is clear, however, that further and perhaps more immediate utility therefor may be seen in the field of radio location of obstacles such as hostile aircraft or other moving bodies. In this latter application, my antenna structure may be employed in a manner analogous to that described in the copending application Serial No. 430,905, filed February 14, 1942, of R. Hoffman. In accordance with this latter invention, relatively brief trains of high frequency energy are intermittently radiated first in one general direction and then in another. Appropriate receiving and detection apparatus is provided for detecting and indicating the magnitude of reflections of energy transmitted in each of these alternate directions and means are provided for comparing the magnitude of a reflection from a given object as obtained from wave trains transmitted in one of these general directions with reflections from the same object due to wave trains transmitted in the other of these general directions. By then reorienting the transmitting antenna structure so that reflections obtained due to wave trains transmitted in each of these general directions are of the same magnitude for a given reflecting object, an exact bearing may be taken on the reflecting object.

It is clear that the sensitivity of such an obstacle detection system is to a large degree dependent upon the steepness of intersection of the lobes characterizing radiation in each of these general directions. The teachings of the present invention are, therefore, immediately applicable to and desirable for such a device. It is to be noted that in the application of my invention to obstacle detection, the presence of minor lobes of radiation may not be too objectionable since radiation may be manually aimed in the general direction of the object being detected. The substantial elimination of such minor radiation is, however, considered preferable inasmuch as annoying effects due to reflecting objects in the direction of such minor radiation are proportionately cut down.

Since minor lobe radiation may be tolerated in radio location applications of the invention, it will be possible to discriminate as to direction with even greater sensitivity than in the assumed cases illustrated herein. Thus, spacings between individual elements may be enlarged with respect to the wave length of transmitted energy and it may not be necessary in an application of this nature to provide swamping radiation, as was shown to produce the pattern of Fig. 11d.

Although I have shown my invention as being particularly workable when keying is effected so that energy feeding the respective antenna elements is periodically reversed in phase so as to set up alternate clover-leaf-lobe polarities, it is clear that the keying may be effected so that the clover-leaf lobes are of steady polarities, and the alternate reversal of phase is effected in the energy supplied to produce the dumb-bell patterns, whereby essentially the same resultant alternate radiation may be obtained. It is further clear that, as above indicated, instead of keying to produce alternate radiation patterns in the manner above described, it may in certain instances be preferable so to modulate certain of the elements of the combined array as to produce radiation to one side of the course characterized by a first modulating signal and radiation to the other side of the course characterized by a second modulating signal, whereby visual indicating means may be used on the aircraft to detect whether or not the pilot is on course. An embodiment for carrying out this latter method of defining a radio course has been fully treated in the above-mentioned copending application of A. Alford, wherein the radiation off course inherently could not be characterized by the extreme directivity obtainable in accordance with the present invention.

Figure 7A:
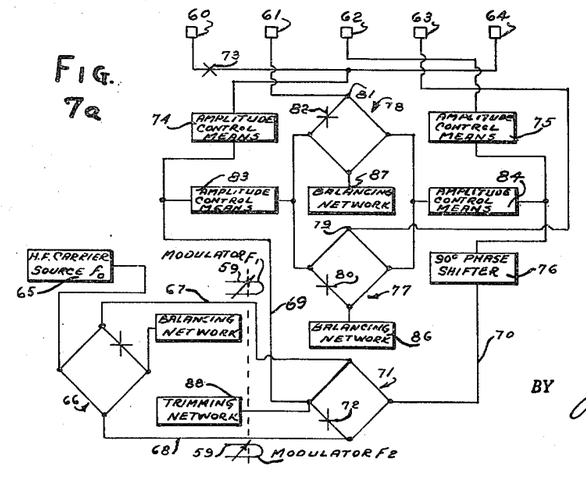

A possible circuit for feeding antenna elements to produce a course suitable for visual indication on the aircraft is shown schematically in Fig. 7a. For purposes of simplicity the number of elements in the antenna array of this figure has been reduced to five: viz. elements 60, 61, 62, 63, 64. In the case illustrated the array is designed to set up a single clover leaf and a single dumb-bell pattern. The clover leaf has major lobes of radiation to one side of the course characterized essentially by the side bands of a constant signal $F_1$ in negative phase and by the side bands of a constant signal $F_2$ in positive phase, and the major lobes of radiation to the other side of the course are characterized by the side bands of a steady signal $F_1$ in positive phase and the side bands of the steady signal $F_2$ in negative phase.

By positive phase is meant such phase that, in a given direction one side of the course, the signals characterizing the dumb-bell component of overall radiation will combine therewith in greater magnitude than for a corresponding deviation to the other side of the course; and by negative phase is meant such phase that, in a given direction to the other side of the course, the signals characterizing the dumb-bell component of overall radiation will combine therewith in greater magnitude than for a corresponding deviation to said one side. Preferably "positive phase" waves at any point in space are of exactly the same phase as waves from the dumb-bell at the same point, and "negative phase" waves are of opposite phase. The dumb-bell pattern is characterized by a steady signal proportional to a summation of the signals $F_1$ and $F_2$ including their respective carriers so that when radiated together with the clover-leaf side-band patterns just noted, radiation to one side of the course will be characterized essentially by the signal $F_1$ and to the other side of the course by the signal $F_2$.

In the case illustrated, the clover-leaf pattern is produced by a subtraction of coefficients of two displaced binomial expansions of the third power performed in the above-indicated manner so as to require a four-element array having no center element and fed with energy proportional to the respective magnitudes $+1, +2, 0, -2, -1$ for side bands, say of signal $F_1$, and with currents proportional to the magnitudes $-1, -2, 0, +2, +1$ for the side bands of the signal $F_2$. A suitable array for producing a dumb-bell to be superposed upon such a clover leaf array would be a three-element one having currents fed to the successive elements thereof in magnitudes proportional to the successive coefficients of a second power binomial expansion and at a phase angle of substantially 90°, that is substantially equally displaced in phase with respect to energy fed to the left-hand and right-hand elements of the clover leaf array. By appropriate spacing of elements the outer elements of the dumb-bell array may be effectively combined with the inner elements of the clover-leaf array so as to reduce the overall number of elements required to only five.

Thus, the feeding means for producing radiation patterns, characterized as above indicated, from such a combined array must be able to supply the outer elements 60 and 64 with side band currents of signals $F_1$ and $F_2$, these currents being in opposed phase in each of these outer elements as above noted. The feeding means must further supply a steady signal, characterized by carrier and both side bands of both signals $F_1$ and $F_2$, to the central conductor at the appropriately displaced phase angle 90° since the clover leaf does not require a central element. The feeding means must still further supply the intermediate elements 61 and 63 with both carrier and side bands, the magnitudes and phases of side-band currents being proportioned to the magnitudes and phases of carrier-plus-side-band currents in accordance with a vectorial summation of the appropriate coefficients of the dumb-bell binomial expansion and the clover-leaf combined-binomial resultant.

As stated, the relatively simple feeding means for producing this result is shown in Fig. 7a in which carrier energy $f_0$ is generated by a source 65 and distributed by means of a conjugate network (designated generally 66) into two channels 67 and 68 for modulation by two steady modulating signals to form modulated signals $F_1$ and $F_2$ respectively. This modulation may be effected in the relatively simple manner disclosed in the above-mentioned copending application of A. Alford and schematically illustrated by variably tuned coupled sections 59, 59'. The two modulated signals $F_1$ and $F_2$ are then mixed and distributed into two further channels 69, 70 by means of another conjugate network (designated generally 71) having a phase reversal element 72 in one arm thereof, whereby channel 69 receives a differential of the modulated signals $F_1$ and $F_2$ and channel 70 receives a summation thereof. Since the current in line 69 is a differential of the two modulated signals, the carrier current may cancel out to leave only side band energy therein. I propose that this energy be fed directly to the outer antenna elements 60 and 64 in the manner shown, there being a phase reversal element 73 in the line feeding one of these outer antenna elements, whereby side-band currents in one outer element 60 are of opposed phase with respect to side-band currents in the other 64, in order to meet the above noted desired feeding conditions for these elements. If desired, suitable amplitude control means 74 may be included in the line feeding antenna elements 60 and 64 so as to aid in adjustment of magnitudes of currents fed thereto in accordance with calculated values.

Since the currents present in branch 70 represent a summation of the signals $F_1$ and $F_2$, this line carries currents including both side bands of both signals plus their carriers and may accordingly supply appropriate energy to the central radiating element 62. As in the case of the line supplying outer elements 60 and 64, the line supplying the central element 62 may include amplitude control means 75 in order to proportion current magnitudes appropriately in accordance with calculated values. It will be noted that this line 70 must further include phase shifting means 76 so that the currents supplied the antenna 62 will be substantially out of phase with side band energy in the outer antenna elements.

Since current energy fed to the intermediate antenna elements 61 and 63 in each case represents a combination of current producing the clover leaf and current producing the dumb-bell patterns, I propose that connections be made to each of the lines 69 and 70 in order to supply these intermediate elements 61 and 63. In the form shown, this connection comprises two conjugate networks 77 and 78 to opposite ends of each of which connections are made from the respective lines 69 and 70. In the case of network 77, output connection is taken from a free terminal 79 opposite the arm containing phase reversal element 80 and in the case of networks 78, output is taken from terminal 81 adjacent the arm containing the phase reversal element 82. In one case, output current is taken to feed antenna element 63 and in the other the output current supplies antenna element 61. It will be noted that in each case, the phase reversal element 80 or 82 of bridge 77 or 78, as the case may be, is adjacent the connection to line 69 whereby the wholly-side-band energy present in line 69 may be supplied to antenna 61 in phase opposition to that being supplied to antenna 63. It will further be noted that connection from the other side of the respective conjugate networks 77 and 78 is made to line 70 after the phase shifting has been effected so that energy characterizing the dumb-bell component of currents for antenna elements 61 and 63 will be substantially out of phase with the currents characterizing the clover leaf components thereof. It is considered preferable that appropriate amplitude control means 83 and 84 be provided on each side of the conjugate networks 77 and 78 in the respective connections to lines 69 and 70, whereby the amplitudes of energy characterizing the dumb-bell and clover-leaf pattern, respectively, may be selectively adjusted in accordance with the calculated magnitudes.

It is to be observed that in each of the conjugate networks 66, 77, and 78, only three of the four terminals thereof were actually required. Accordingly, appropriate balancing network means 85, 86, and 87, respectively, have been provided for each of the unused terminals of these networks, whereby an interchange of energy between lines connecting opposite ends of the conjugate networks is averted, as will be clear. In the case of conjugate network 71, all four terminals thereof were employed. However, it is preferable to provide a trimming network 88 in connection with one of the terminals thereof, whereby any unbalance in the respective impedances looking into lines 69 and 70 may be compensated for, and thus may an interchange of energy from line 67 into line 68, and vice versa, be averted.

It is clear that the device shown in Fig. 7a is a relatively simple arrangement for producing an equi-signal course beacon that is readily adaptable to existing visual indicating systems. It is furthermore to be understood that even sharper courses may be defined by employing arrays having a larger number of elements and fed with feeding means completely analogous to that shown and described in connection with Fig. 7a.

The invention is considered to possess particular merit in its use with relatively small side radiation, as in the embodiment of Fig. 10, having an overall radiation pattern as in Fig. 11d. In such an embodiment it is clear that radiation is so substantially confined to the course, or to the general direction to be scanned for obstacles, that the presence of reflecting objects, such as buildings, trees, etc., in the vicinity of the apparatus, may have negligible harmful effects on the fidelity of the course or other signals radiated therefrom, particularly at ultra-high frequencies.

It will be noted that I have described my invention in particular in connection with certain preferred forms. It is to be understood, however, that many modifications thereof may be made. For example, for any particular antenna design in accordance with the invention certain other proportionings of relative current magnitudes may be found desirable—that is, other than shown. The invention is thus not to be considered as limited by the examples discussed above but rather as defined in the appended claims.

What is claimed is:

1. An antenna array comprising a plurality of elements disposed in spaced and substantially aligned relation, wave-translating means, and means for coupling successive of said elements with said wave-translating means in successive energy transfer relationships proportional to successive resultants obtained by subtracting successive coefficients of a binomial expansion of a given order from successive coefficients of another such expansion of said order, the coefficients of one expansion being displaced a whole term with respect to the other expansion, whereby complete cancellation will be avoided for an overall resultant of said subtraction.

2. An antenna array according to claim 1 wherein said plurality corresponds in number with the number of resultants substantially different from zero obtained by said subtraction.

3. An antenna array comprising a plurality of elements disposed in spaced and substantially aligned relation, wave-translating means, and means coupling said wave-translating means to successive of said elements with energy transfer relationships in phase and amplitude proportional to successive terms formed by adding vectors at a given angle and proportionate to successive coefficients of a binomial expansion of a given order to vectors at another given angle and proportionate to successive coefficients of another such expansion of said order, coefficients of said first mentioned expansion being displaced at least one whole term with respect to those of said second mentioned expansion, said vectorial addition further including vectors proportional to successive coefficients of a further expression, successive of said elements being spaced a given amount for each interval between each said vectorial addition, there being no element for said array where a resultant of said vectorial addition is substantially zero.

4. An antenna array according to claim 3 wherein said further expression includes a series of resultant vectors formed by a combination of vectors corresponding to the coefficients of two further binomial expansions, the vectors corresponding to one of said two further expansions being at a different angle than those corresponding to the other.

5. An antenna array according to claim 3 wherein said further expression includes a series of resultant vectors formed by a combination of vectors corresponding to the coefficients of two further binomial expansions, the vectors corresponding to one of said two further expansions being at a different angle than those corresponding to the other, said addition further comprising a set of vectors symmetric about the center of said array and at a given angle with respect to the other mentioned of said angles.

6. An antenna array according to claim 3, further comprising keying means included in said coupling means for alternately interchanging said given angles in accordance with a given code.

7. An antenna array comprising a plurality of elements disposed in spaced and substantially aligned relation, wave-translating means, means for coupling said wave-translating means to successive of said elements with energy transfer relationships proportional to successive terms formed by successively adding vectors having a given angle and proportionate to successive coefficients of another such expansion of a said order, the coefficients of said first mentioned expansion being displaced at least one whole term with respect to those of said second mentioned expansion, said addition further including further vectors having a further given angle and proportionate to successive coefficients of a further binomial expansion of a further given order, said further angle being substantially intermediate said first two mentioned angles.

8. An antenna array according to claim 7 wherein said wave-translating means includes a source of carrier energy modulated by a first signal and a source of carrier energy modulated by a second signal; and wherein said coupling means includes means feeding energy from said first source and energy from said second source in substantially opposite phasal relation to elements of said antenna array corresponding to said coefficients of said first two mentioned expansions, and means feeding energy from said first source and energy from said second source in substantially cophasal relation to elements of said antenna array corresponding to said coefficients of said further expansion.

9. A directional array for use with waves of wavelength λ, which comprises one antenna element for each substantially large term in the expansion of $$A(x^a+x^{-a})^m(x^a-x^{-a})+B(x^b+x^{-b})^{m'}(x^b-x^{-b})+\\C(x^c+x^{-c})^{m''}(x^c-x^{-c})+ \ldots jP(x^p+x^{-p})^n+\\jQ(x^q+x^{-q})^{n'}+jR(x^r+x^{-r})^{n''}\ldots,$$

all said elements being substantially aligned and the spacing of each element from the center of the array being substantially λ times the power of $x$ in the corresponding term of said expansion, wave translating equipment, and coupling means coupling said equipment to said elements with transmission factors substantially proportionate to the coefficients of the corresponding terms of said expansion, where A, B, C, etc., and P, Q, R, etc., are real numbers of which at least A and P differ from zero while $m, m', m'', n, n', n''$ are integers of which $m$ is at least 2.

10. An antenna array comprising a plurality of antenna elements disposed in spaced substantially aligned relation, a wave-translating means, means for coupling said wave-translating means to successive of said elements oppositely disposed with respect to the center of said array in phase opposed relation and in energy transfer relation to energize the two outer elements of said array at a given energy level and each successive inwardly disposed pairs of elements at an energy level proportionate to the difference between successive coefficients of a binomial expansion of a given order, having said given energy level as its first coefficient.

11. An antenna array comprising an even plurality of antenna elements disposed in spaced substantially aligned relation, said elements being spaced apart on opposite sides of a central position a predetermined distance, the elements on each side thereof being spaced apart from each other by substantially half said distance, a wave translating device, means for coupling said elements to said translating device with successive elements similarly disposed on opposite sides of said central position energized in phase opposition with respect to one another, and in energy transfer relation to energize the two outer elements of said array at a given energy level and each successively inwardly disposed pair of elements at an energy level and a phase relation with respect to said outer elements determined by the vectorial addition of the coefficients of binomial arrays of predetermined orders and phase angles with respect to said given energy level.

12. An antenna array according to claim 11 further comprising an antenna element disposed at said central position, and means for coupling said element to said wave-translating device in substantially ninety degrees phase relation with respect to said two outer elements and at a predetermined energy level.

13. An antenna array comprising an odd plurality of antenna elements equally spaced from one another in a line, a wave-translating means, and energy transfer means for coupling each of said antennas to said wave-translating means in energy transfer relation, to energize the successive elements of said array at relative energy levels and in a phase relation with respect to one another determined by the vectorial sum of the coefficients of a first binomial expansion of a given power two less than the number of elements in said array, a second binomial expansion of said given power displaced a whole term with respect to said expansion first named and of opposite sign, and a third binomial expansion of an even power less than said given power and of a sign mid-way between said first and second binomial expansions.

14. An antenna array according to claim 13, wherein said equal spacing is substantially 180 electrical degrees.

15. An antenna array according to claim 13 wherein said equal spacing is greater than 180 electrical degrees, further comprising additional antenna elements spaced on opposite sides of the central element of said array substantially midway between said central element and the next adjacent elements, and means for coupling said additional elements to said wave-translating device in phase opposed relation and with a phase displacement of 90° with respect to said central element, and in energy transfer relation to energize said additional units at a level less than one-tenth of the energy level in any other of said antenna elements.

16. The method of producing a highly directive radiation pattern from a plurality of antenna elements disposed in spaced substantially aligned relation, which comprises energizing the two outer elements of said array at a given energy level and in phase opposition, and energizing successive pairs of said elements inwardly toward the center of said array in phase opposition and at graded energy levels proportionate to the difference between successive coefficients of a binomial expansion of a given order having said given energy level as its first coefficient.

17. The method of producing a highly directive radiation pattern from an odd plurality of equally spaced aligned antenna elements, comprising energizing the successive elements of said array at relative energy levels and in a phase relation with respect to one another determined by the vectorial sums of the coefficients of a first binomial expansion of a given power two less than the number of antenna elements in said array, a second binomial expansion of said given power displaced a whole term with respect to said first expansion and of opposite sign, and a third binomial expansion of an even power less than said given power and of a sign mid-way between said first and second expansions.

ARMIG G. KANDOIAN.

REFERENCES CITED

The following references are of record in the file of this patent:

UNITED STATES PATENTS

| Number | Name | Date |
| --- | --- | --- |
| 1,643,323 | Stone | Sept. 27, 1927 |
| 1,922,115 | Stone | Aug. 15, 1933 |
| 2,218,487 | Terman et al. | Oct. 15, 1940 |